United States Patent [19]

Shellenberger

[11] 4,181,763

[45] Jan. 1, 1980

[54] PROCESS FOR PRODUCING SIMULATED WOODEN ARTICLES

[76] Inventor: Robert L. Shellenberger, 4711 Wunder Ave., Trevose, Pa. 19047

[21] Appl. No.: 810,492

[22] Filed: Jun. 27, 1977

Related U.S. Application Data

[63] Continuation-in-part of Ser. No. 650,507, Jan. 19, 1976, abandoned.

[51] Int. Cl.[2] .......................... B32B 3/10; B32B 3/26

[52] U.S. Cl. .......................... 428/142; 144/309 A; 144/309F; 427/223; 427/444; 428/141; 428/156; 428/220; 428/537

[58] Field of Search ............... 428/151, 155, 156, 142, 428/220; 427/223, 224, 423, 444, 308, 348; 144/309 A, 309 F, 309 Z; 431/252, 253

[56] References Cited

U.S. PATENT DOCUMENTS

| | | | |
|---|---|---|---|
| 1,566,985 | 12/1925 | Shuler | 427/224 |
| 1,758,336 | 5/1930 | Schmid | 427/223 |
| 2,431,148 | 11/1947 | Stover | 428/155 |
| 2,724,642 | 11/1955 | Brown | 144/309 A |

*Primary Examiner*—George F. Lesmes
*Assistant Examiner*—P. Thibodeau
*Attorney, Agent, or Firm*—George A. Frank

[57] ABSTRACT

A non-chemical, mechanical process for antiquing wood applying a high temperature flame to the surface of a variety of woods for short periods of time, is provided. The processed pieces of variously shaped wood can be coated and are useful as decorative articles and home furnishings.

10 Claims, No Drawings

PROCESS FOR PRODUCING SIMULATED WOODEN ARTICLES

RELATIONSHIP TO OTHER APPLICATIONS

This application is a continuation-in-part of Ser. No. 650,507, filed Jan. 19, 1976, now abandoned.

BACKGROUND OF THE INVENTION

1. Field of Invention

This invention is related to a non-chemical, mechanical process of treating wood and particularly to a process of producing simulated antique wooden objects.

2. Prior Art

A variety of methods for the beautification of wood surfaces are known in the art. Those utilizing a series of steps comprising the covering portions or all of the surface of the wood with a non-burning chemical (see e.g. U.S. Pat. No. 1,566,985, issued July 23, 1925 to J. Shuler), followed by applying a flame to the coated surface, and finally removing the charred portions and the chemical residues suffer from the disadvantage of being a multi-step operation and also of using corrosive chemicals such as sulfuric acid, as shown in U.S. Pat. No. 749,004, issued Jan. 5, 1904 to K. Wadamori.

Some processes of the prior art achieve a decorative (ornamental) appearance of wood, as shown in U.S. Pat. No. 922,026, issued May 18, 1909 to F. Y. Nishimura, by mechanically patterning the grain to obtain a desired pattern followed by slightly burning the exposed surface and cleaning away the charred particles. This, too, is a time consuming process not well adaptable to commercial application.

Use of fire in the process of ornamenting wood is also well known in the art. The sugi process, or example, comprises the use of wood having a lacy hard and soft grain figure, the surface of which is smoothed and charred with a flame from a blow-torch. Manual scraping accomplishes the removal of the charred soft grain portions leaving behind a high-low surface relief pattern (see e.g. U.S. Pat. No. 2,724,624, issued Nov. 22, 1955 to O. Brown).

Most processes that utilize fire in the process of ornamenting wood affect the surface of the wood only, the fire consuming the soft portions of the surface leaving the solid veins in relief. Such processes, as described for example in U.S. Pat. No. 695,417, issued Mar. 11, 1902 to M. Schirm or in U.S. Pat. No. 1,758,336, issued May 13, 1930 to E. Schmid, however, are ineffective in providing deep hollows and impressions in the wood, they basically only bring the grain standing out in relief. In these processes a secondary step, usually comprising brushing the surface of the wood with suitable wire brushes, is necessary to remove the charred remains of the spongy portion of the wood. In some cases minute metallic particles are supplied to the flame which propels them against the wood thereby facilitating the removal of the spongy parts.

The single-step process of this invention is capable of producing weathered-looking or simulated antique wood wherein deep hollows, grooves, holes, slots, recesses, and cracks can also be created which were not heretofore possible without time consuming mechanical operations.

SUMMARY OF THE INVENTION

According to this invention a process for producing simulated antique wooden articles comprising the application of a flame from a cutting torch to different portions of the wood surface for varying lengths of time and the simultaneous intermittent application of a gas jet to the hot portions of the wood surface is provided.

The process is applicable to a variety of woods, both hardwoods and softwoods. The processed simulated antique articles useful as decorative articles and home furnishings are also contemplated in this invention.

DESCRIPTION OF THE INVENTION

The process of this invention, for antiquing wood, is a non-chemical, mechanical process which utilizes a cutting torch for achieving the desired effects. To those skilled in the welding and metal working arts, the process is known as flame cutting. For the purposes of this invention, flame cutting is defined as cutting hollows, grooves, holes, slots, recesses, and cracks by a combustion supporting gas-fuel gas torch flame which has a gas jet. The cutting is carried out by a rapid oxidation process at a high temperature produced by a gas flame, accompanied by a gas jet through the torch which blows the burnt, charred materials away from the cut.

The antiquing process of this invention is carried out by the intermittent application, in spots or along lines, of a hot flame, provided by a cutting torch, to the surface of a wood article, accompanied by a cutting jet action, thereby providing simulated antique wood articles. The length of time of flame application and the jet action of a gas such as oxygen, from a third passage of the cutting torch, among others, are critical factors in creating the useful simulated antique articles of this invention During the antiquing process of this invention the cutting torch cuts through (or across) the hard grain portion of the wood resulting in design elements which can go deeply below the wood surface. The hard grain of the wood is not affected by application of a flame from a blow torch to the wood surface and its use is not contemplated within the process of this invention.

A high temperature flame can, under ordinary circumstances and given sufficient length of time, generate burning amber and fire and consume pieces of wood or char them beyond any practical usefulness. This can happen when a blow-torch is utilized. Careful control of the length of time of flame application, depending on the type of wood, the antique design desired, the temperature of the flame, and the pressure of the gas jet, allow the skilled artisan to utilize the process of this invention for the production of practically an infinite variety of simultated antique wood articles. Typically, the process for the production of an element of the design, such as a groove, hollow, crack, hole, recess, slot, etc. can take from approximately 1 second to approximately 60 seconds and preferably from 10 to 50 seconds, although longer time periods cannot be excluded when a very deep design element is desired in a thick wooden work piece.

The temperature of the flame can depend on the fuel gas utilized in the process of this invention. Among the commonly utilized fuel gases are acetylene, propane, hydrogen, natural gas, Mapp (methylacetylene/-propadiene, available through Airco), and butane. From the standpoint of practicality, acetylene is preferred. The temperature of the flame is also dependent on the combustion supporting gas, such as oxygen or air. As can be seen from the table below, the temperature of the flame can range from approximately 3500° F. to approximately 6500° F.

TABLE

| Flame Temperature of Various Fuel Gases | | |
|---|---|---|
| Gas | Flame Temperature With Air (°F.) | Flame Temperature With Oxygen (°F.) |
| acetylene | 4800 | 6300 |
| hydrogen | 4000 | 5700 |
| propane | 3800 | 5300 |
| butane | 3900 | 5400 |
| natural gas | 3800 | 5025 |
| Mapp | 2680 | 5300 |

Again, from a practical standpoint, oxygen is a preferred combustion supporting gas. When the process of this invention utilizes acetylene fuel gas with oxygen, the process is commonly referred to as oxyacetylene cutting.

The oxyacetylene cutting torch utilized in the wood antiquing process of this invention is commonly known in the metal working art. In such a torch the heating flame usually does not come from the center of the tip of the torch but rather from at least one but usually several orifices arranged in a circle around a center gas jet (oxygen) orifice. The cutting operation, i.e., the production of the design elements on and through the surface of the wood piece, can be controlled through the use of a cutting oxygen lever. This lever controls the flow of the gas jet which, in turn, blows the burnt or charred material away from the cut during the process. Without such gas jet the wood would char or burn. Utilizing the gas jet allows this process to cut across the grain of the wood surface.

In the antiquing process of this invention the relative amounts of the fuel gas, such as acetylene, to the combustion supporting gas, such as oxygen, can be varied. One can utilize excess acetylene with oxygen, providing what is called a carburizing flame; excess oxygen with acetylene, providing an oxidizing flame; or approximately equal amounts of the two gases, resulting in a neutral flame. The latter is preferred as allowing proper control during the preparation of simulated antique wood articles of this invention.

Acetylene pressures of approximately 3–20, preferably 3–6, and most preferably about 5 psi can be utilized. Oxygen pressure can range up to 160 psi, although 25–50 psi is preferred, while about 40 psi is most preferred.

The excess oxygen pressure indicated above is necessary to provide sufficient pressure for the oxygen jet utilized in the cutting operation. It is common practice, although by no means a necessity, that the combustion supporting gas and the gas jet be the same and be fed into the cutting torch at a common inlet, later to be divided into two streams. One stream can then be mixed with the fuel gas while the second stream, controlled by a lever or trigger, is utilized as the jet. One can utilize a different gas for the gas jet, but it is preferred that it be the same as the combustion supporting gas.

The cutting torch tips normally have at least two and usually several orifices. One orifice, usually in the center of the tip, is for the cutting gas jet and one or more smaller orifices are for burning/charring the portions of the wood surface along the grooves, holes, cracks or other indentations to be produced. The substantially simultaneous action of the gas jet impinging on the burnt/charred areas of the wood surface unexpectedly affords the design elements producing the simulated antique effects contemplated within this invention. The tips can also serve as the mixing area for the streams of fuel and combustion supporting gases.

During the antiquing process of this invention the tip of the cutting torch, from which the cutting flame is emanating, is usually held at a distance of 0.25–2 inches, preferably 0.25–1 inch, from the surface of the wood piece to be converted into a simulated antique article. It is also possible to have the tip of the cutting torch in contact with the surface. Controlling this distance allows the control of the size of the desired design elements.

A wide variety of woods are suitable objects of the process of this invention. Both hardwoods, wood of an angiospermous tree and softwoods, wood of a coniferous tree, can be utilized to produce simulated antique wooden articles. Among the hardwoods that are suitable are included oak, ash, hickory, elm, chestnut, catalpa, red gum, mahogany, cherry, walnut, butternut, yellow poplar, aspen, cottonwood, willow, birch, maple, basswood, beech, and the like. Among the softwoods that can be utilized in the process of this invention are: redwod, cedar, white pine, eastern hemlock, longleaf pine, western larch, Douglas fir, other true firs, and the like.

For practical application, it is preferred that the wooden piece be at least 0.5-inch thick and more preferably at least 0.75-inch thick. There is no practical upper limit to the thickness. Plywood is not suitable for the purposes of this invention.

The simulated antique wooden articles of this invention can be utilized upon completion of the cutting process of this invention without any further treatment. If desired, however, the surface of the simulated antique articles can be cleaned with, for example, soap and water or with a light brush.

It is also contemplated that such articles can be further treated or coated. For example, the processed articles, generally dark upon completion of the process, can be bleached to a lighter color with an aqueous solution of oxalic acid.

A variety of clear and/or pigmented finishes can also be applied to the wood surface to achieve any desired appearance. Among the finishes are included shellac, nitrocellulose, alkyds, epoxies, isocyanate, acrylics, vinyl acrylics, and the like.

Among the pigments that can be utilized are included titanium dioxide, calcium carbonate, carbon black, zinc oxide, silica, talc, china clay, organic dyes, and the like.

The simulated antique wooden articles of this invention can be utilized in a large vericty of end uses, limited only by the imagination of the skilled artisan. Among these end uses are: candle holders, shelves, mantle pieces, gun cabinets, coffee tables, end tables, kitchen tables, dining room tables, chairs, magazine racks, book ends, book cases, ceiling beams, paneling, stairway steps, railings, lawn furniture, night stands, desks, bar tops, hutches, ship wheels, wagon wheels, flower stands, wood plaques, doors, window frames, lamp bases, dressers, hampers, benches, toy boxes, storage chests, stools, chairs, rocking chairs, credenzas, dry sinks, consoles, picture frames, plant holders, telephone stands, serving carts, moulding and trim for home use, other nautical items, and the like.

In the following Examples, which illustrate the invention, all parts are by weight unless otherwise stated.

EXAMPLES 1-11

To the surface of a 1-inch thick board is applied the flame from a cutting torch from a distance of 0.5 inch. Using acetylene fuel gas and oxygen as both the combustion supporting gas and the gas jet, a hole of the following approximate dimensions is produced on different woods in the specified length of time, while the jet control is in an open position:

| | | Hole | | |
|---|---|---|---|---|
| Example | Wood | Maximum Diameter (inch) | Depth (inch) | Time (seconds) |
| 1 | redwood | 2.3 | 0.6 | 17 |
| 2 | mahogany | 3 | 0.8 | 37 |
| 3 | maple | 1.5 | 0.3 | 24 |
| 4 | cherry | 2.5 | 0.8 | 37 |
| 5 | fir | 2.5 | 0.8 | 27 |
| 6 | ash | 2.3 | 0.6 | 37 |
| 7 | black walnut | 2.3 | 0.6 | 32 |
| 8 | oak | 2.4 | 1.1 | 40 |
| 9 | birch | 2.5 | 0.8 | 36 |
| 10 | poplar | 2.5 | 0.8 | 25 |
| 11 | pine | 2.8 | 0.6 | 23 |

EXAMPLES 12-13

Using the procedure of the above Examples but by moving the torch along an imaginary line, a crack of the following approximate dimensions is produced on different woods in the specified length of time:

| | | Crack | | |
|---|---|---|---|---|
| Example | Wood | Length (inch) | Depth (inch) | Time (seconds) |
| 12 | cherry | 11 | 0.4 | 25 |
| 13 | black walnut | 7.5 | 0.5 | 15 |

EXAMPLE 14

An unfinished pine door is processed on one of its sides according to the above Examples to provide random design elements. The antiqued door so produced is coated with a liquid epoxy composition and is allowed to cure. The final article, having a clear, tough, non-yellowing, scratch-, mar- and chemical-resistant finish, is useful as a top of a bar. Its appearance is that of having been taken from an ancient sunken ship.

EXAMPLE 15

A storage chest is processed according to Examples 1-13 to provide random design elements. The antiqued chest so produced is painted with a water-based composition containing titanium dioxide, 12 parts; calcium carbonate, 19 parts; vinyl acrylic copolymer, 12 parts; linseed oil alkyd, 4.6 parts; mildewicide, 0.2 part; and carbon black, 5 parts. The coated chest is a simulated antique decorative article having a driftwood color.

What is claimed is:

1. A process for producing simulated antique wooden articles consisting essentially of the application of flame articles consisting essentially of the application of flame from a cutting torch to different portions of the surface of wooden articles at least 0.5-inch thick to provide articles having holes, grooves, cracks, slots, recesses or a combination of these design elements, wherein said design elements are cut across the grain of the wood surface; wherein said flame is provided by the burning of a mixture of a fuel gas and a combustion supporting gas and wherein through said torch is provided a substantially continuous stream of gas jet impinging on said surface, said gas jet also providing simultaneous removal of char from the design elements.

2. The process of claim 1 wherein the wood substrate for said wooden articles is selected from the group consisting of hardwood and softwood.

3. The process of claim 1 wherein said fuel gas is at least one gas selected from the group consisting of acetylene, hydrogen, propane, butane, methylacetylene/-propadiene, and natural gas.

4. The process of claim 1 wherein said combustion supporting gas is selected from the group consisting of oxygen and air.

5. The process of claim 1 wherein the gas utilized for said gas jet is also utilized as the combustion supporting gas.

6. The process of claim 1 wherein the duration of flame application is about 10-50 seconds, from a distance of about 0-2 inches, wherein said distance is defined as the distance between the tip of said cutting torch and the surface of said wooden articles, and wherein said fuel gas is acetylene, said combustion supporting gas is oxygen and said gas jet is oxygen.

7. A simulated antique wooden article produced by the process of claim 1.

8. A simulated antique wooden article produced by the process of claim 6.

9. The simulated wooden article of claim 7, the article having a protective coating thereon.

10. The simulated wooden article of claim 9 wherein the protective coating also contains a pigment.

* * * * *